July 23, 1968 S. N. CHIRCHILL 3,393,808
APPARATUS FOR STORING, DISPLAYING AND DISPENSING ARTICLES
Filed Oct. 7, 1965 8 Sheets-Sheet 1

INVENTOR.
SAM N. CHIRCHILL
BY
Williams and Kreske
ATTORNEYS

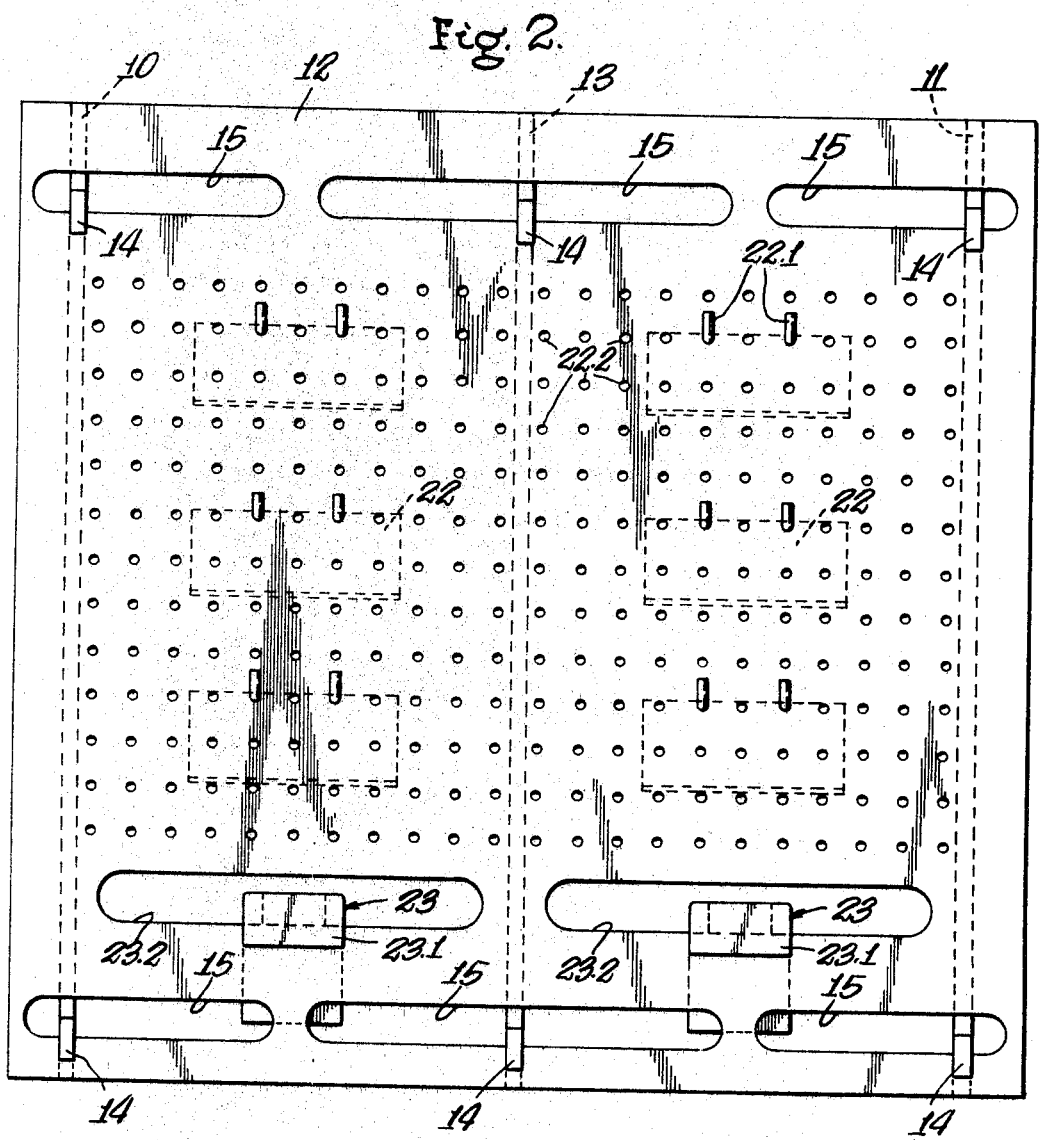

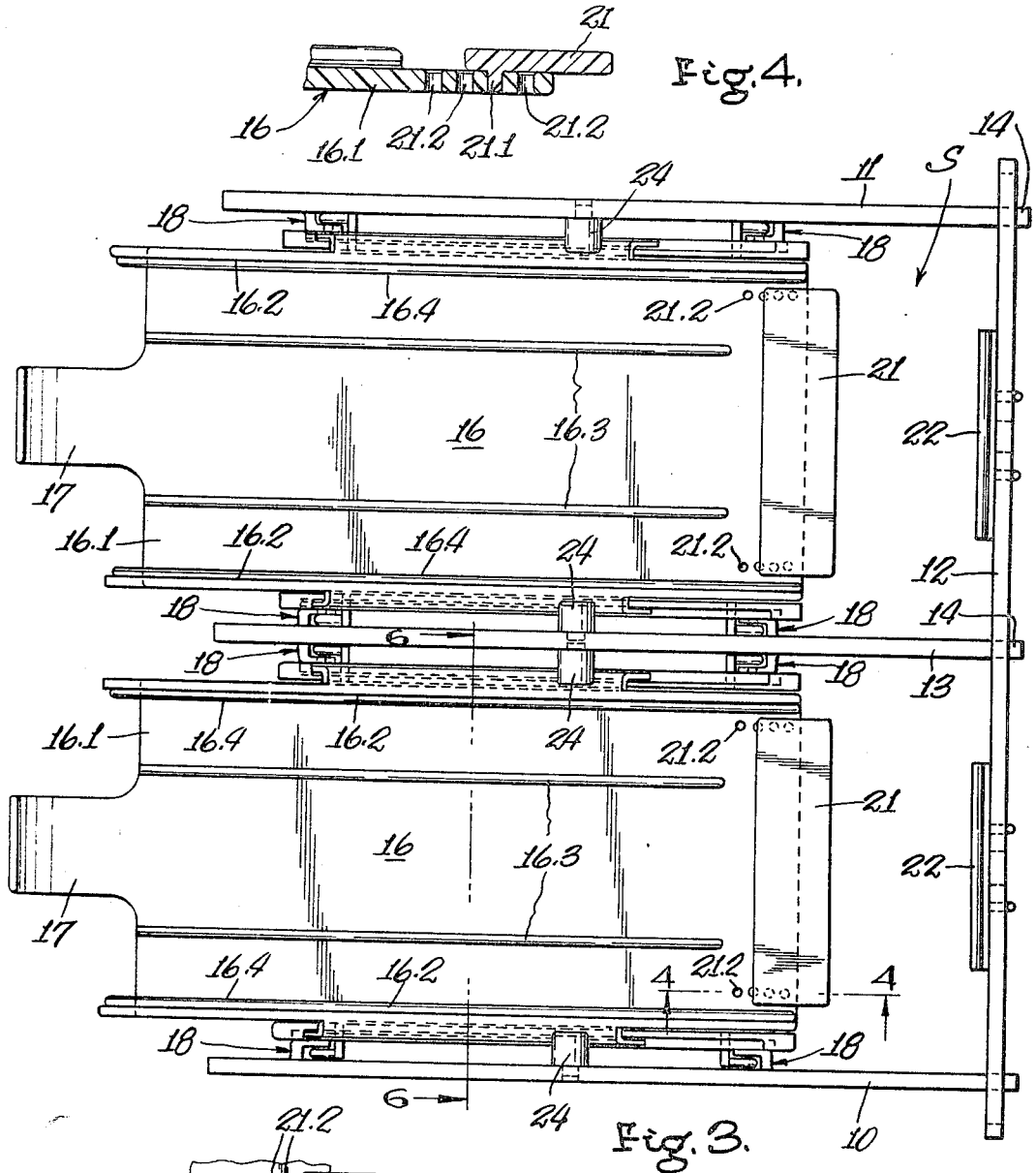

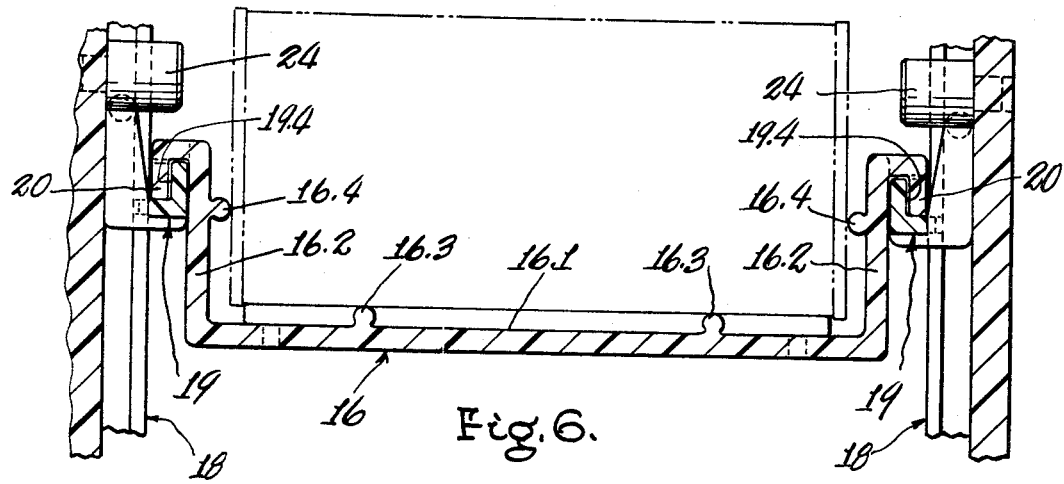
Fig. 6.
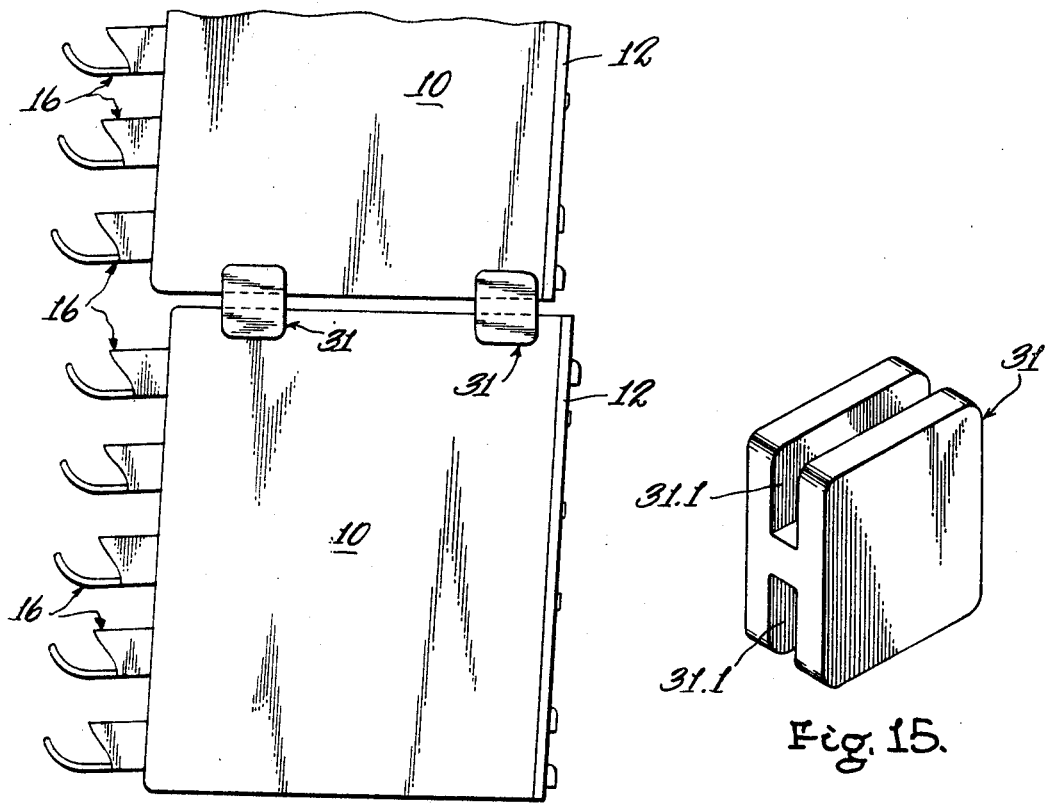
Fig. 14.
Fig. 15.
INVENTOR.
SAM N. CHIRCHILL

INVENTOR.
SAM N. CHIRCHILL
BY
Williams and Kreske
ATTORNEYS

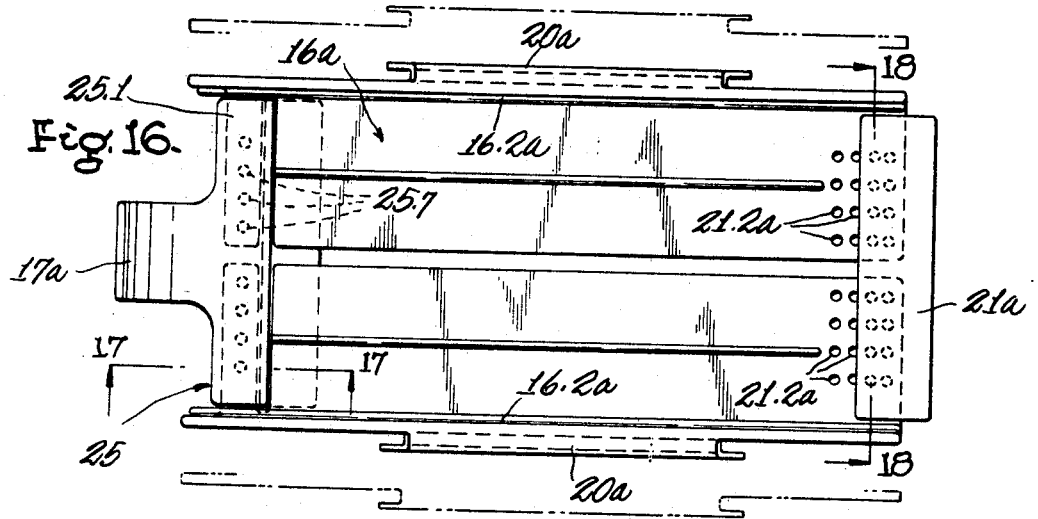
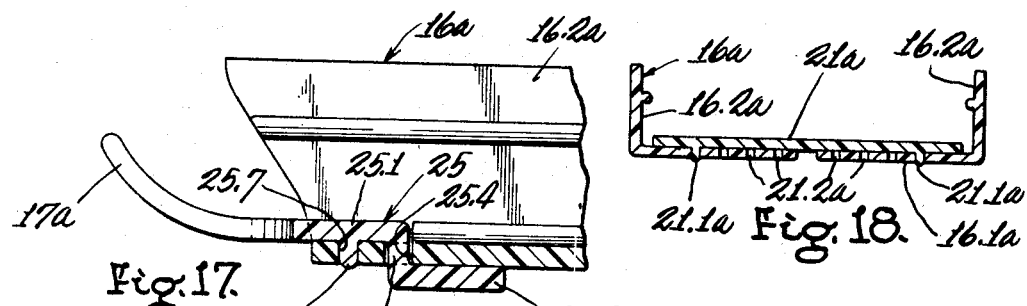
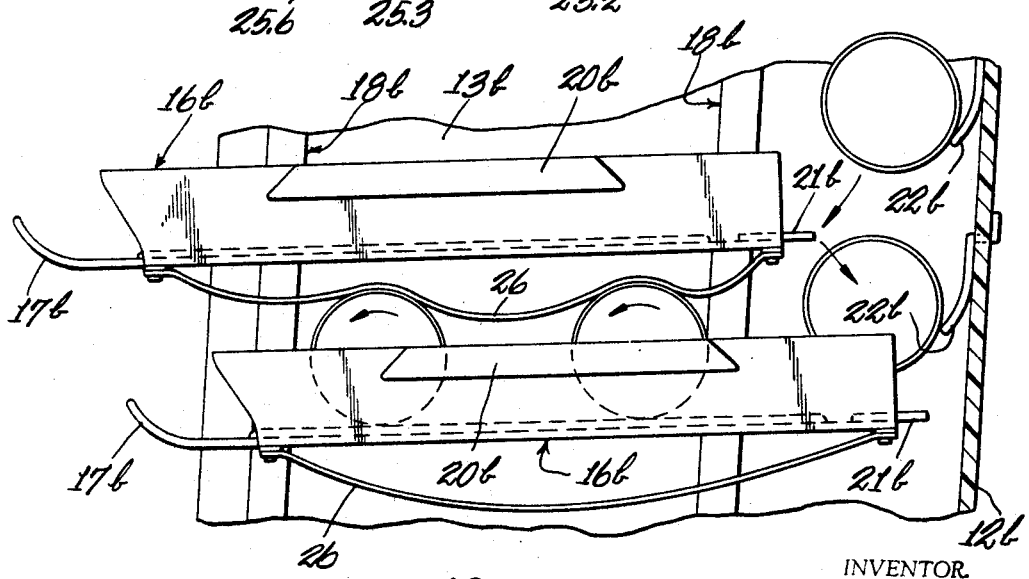

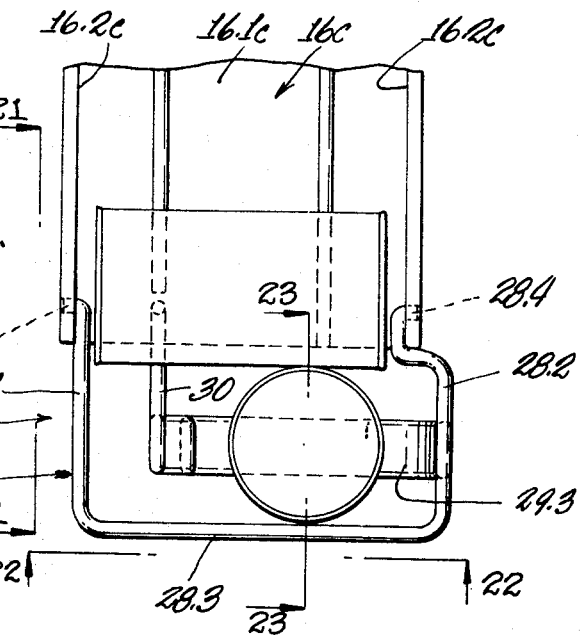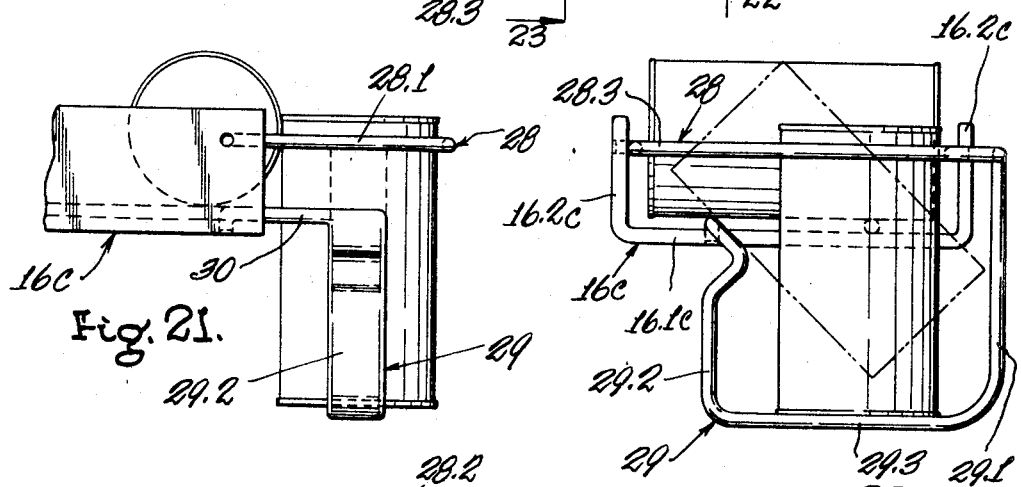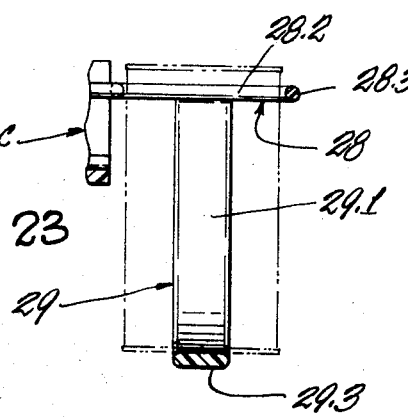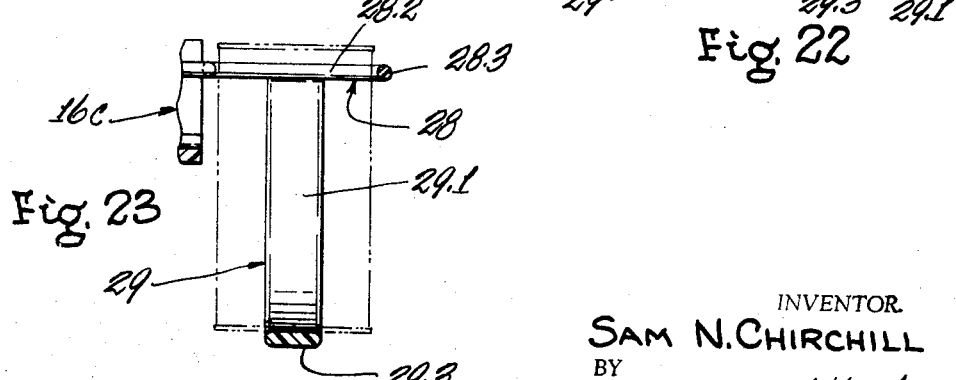

United States Patent Office 3,393,808
Patented July 23, 1968

1

3,393,808
APPARATUS FOR STORING, DISPLAYING AND
DISPENSING ARTICLES
Sam N. Chirchill, 3727 Baymar Drive,
Youngstown, Ohio 44511
Filed Oct. 7, 1965, Ser. No. 493,799
28 Claims. (Cl. 211—49)

ABSTRACT OF THE DISCLOSURE

A storage, display and dispensing cabinet for jars or cans of food which is filled from the back and dispenses articles from the front. The cabinet has a plurality of shelves, each tilted downwardly at the front so that articles in the shelves will always be at the front of the cabinet. A combination of deflectors and forwardly movable shelves provides for selective loading of the shelves. The shelves and mounting means therefor are adjustable to provide considerable accommodation for articles of various sizes.

---

Figure 1:
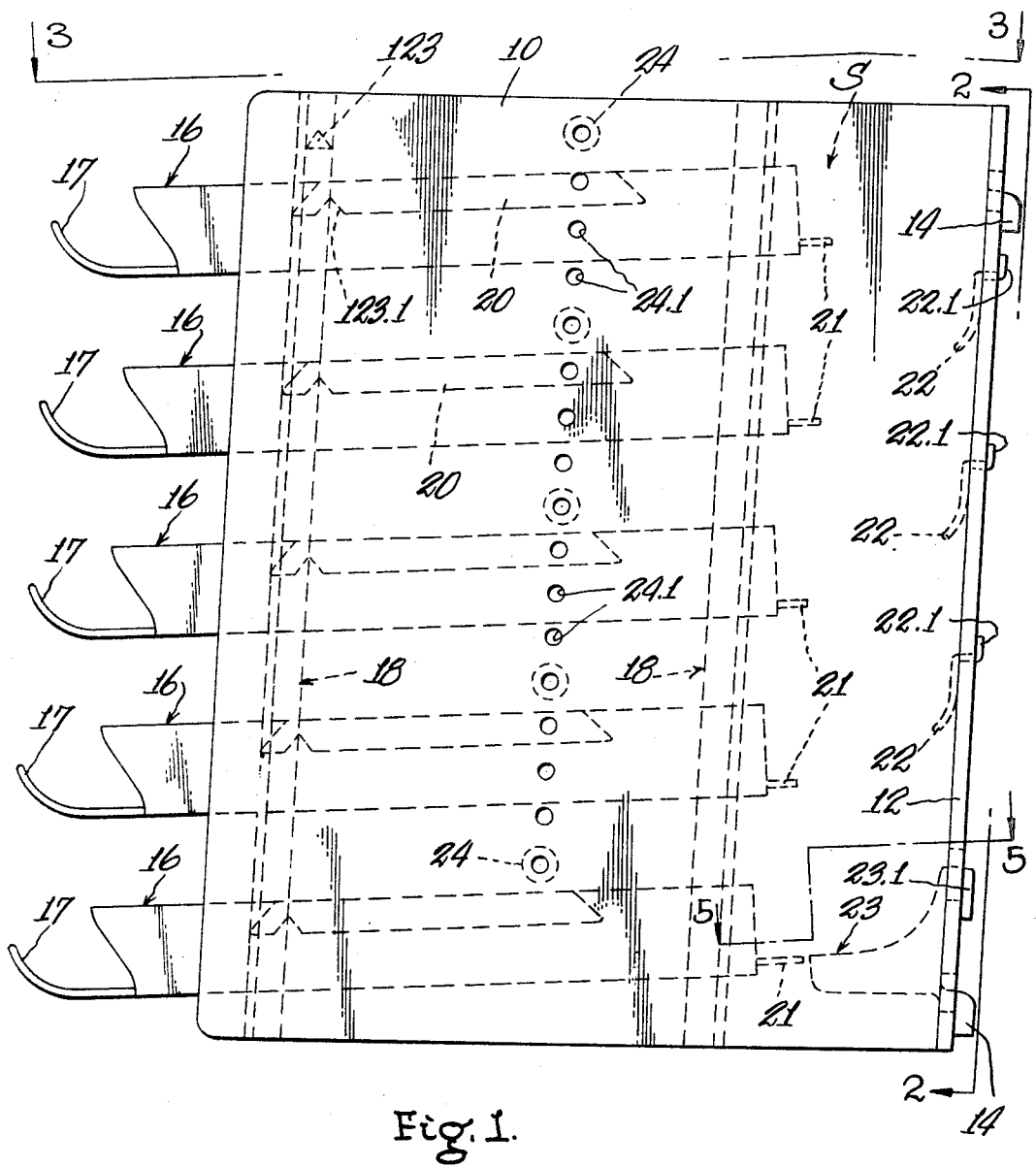

The present invention relates to apparatus for storing, displaying and dispensing articles such as jars or cans of food and the like, and the principal object of the invention is to provide new and improved apparatus of the character described.

Traditionally and in the normal self-service food market, canned food and the like is stored and displayed for sale on conventional shelves from which the customer helps himself. In order to save space, the cans or other articles are frequently stacked on top of each other.

Experience has shown that considerable labor is expended in stacking shelves in the conventional manner. Additionally, the customer is often inconvenienced by having to reach to the rear of a shelf to obtain the required article unless the shelves are frequently restocked or the articles rearranged thereon. Furthermore, when the articles are stacked, a careless customer, or a child, can cause a number of articles to fall, thus necessitating that they be restacked. If the articles are glass jars, rather than cans, it will be appreciated that many can be broken in the event they fall off the shelf.

In order to obviate some of the above difficulties, special racks have heretofore been provided for certain types of articles, notably for glass jars of baby food. Such racks, however, have not been entirely successful since they have been wasteful of space, troublesome to load, inconvenient to use, and not sufficiently flexible to accommodate changing buying habits and changing product lines.

The present invention provides racks for storing and dispensing cylindrical articles, such as cans and jars and the like, with great efficiency. Racks of the present invention can be loaded with great rapidity, the articles are always accessible for easy removal by the customer, maximum space utilization is effectuated, and the racks are flexible both horizontally and vertically to provide for changing needs. These and other advantages will readily become apparent from a study of the following description and from the appended drawings.

In the drawings accompanying this specification and forming a part of this application there is shown, for purposes of illustration, embodiments which the invention may assume, and in these drawings:

FIGURE 1 is a side elevational view of preferred embodiment of a rack constructed in accordance with the present invention, FIGURE 2 is a rear elevational view generally corresponding to the line 2—2 of FIGURE 1,

2

Figure 7:
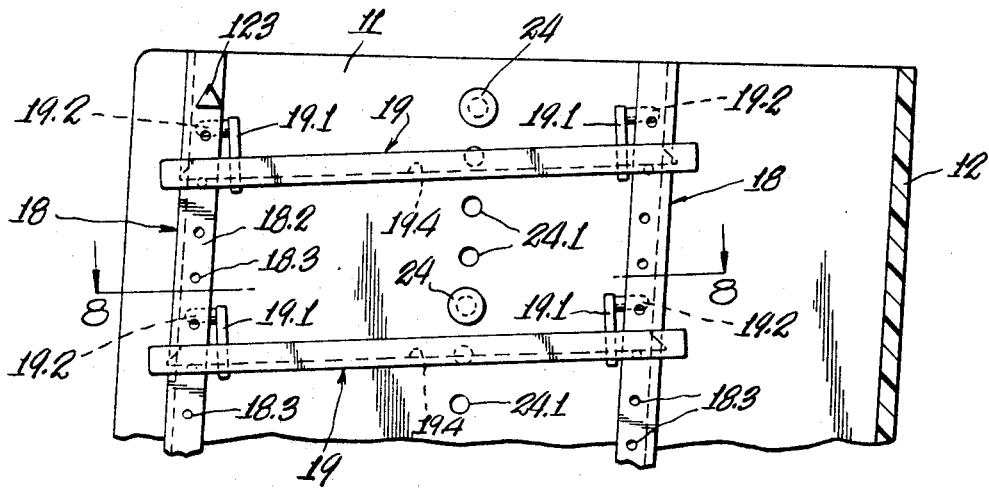
Figure 8:
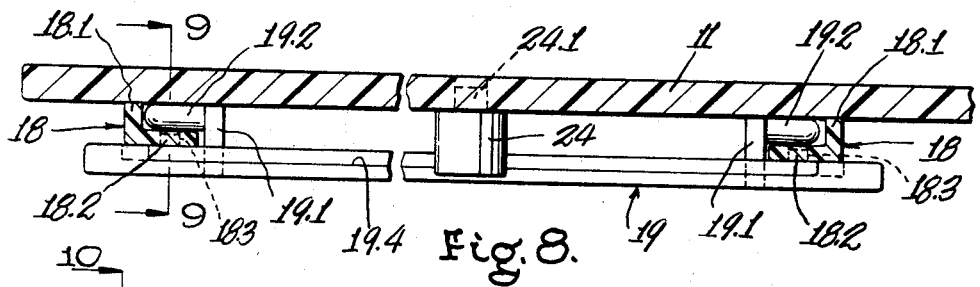
Figures 9, 10:
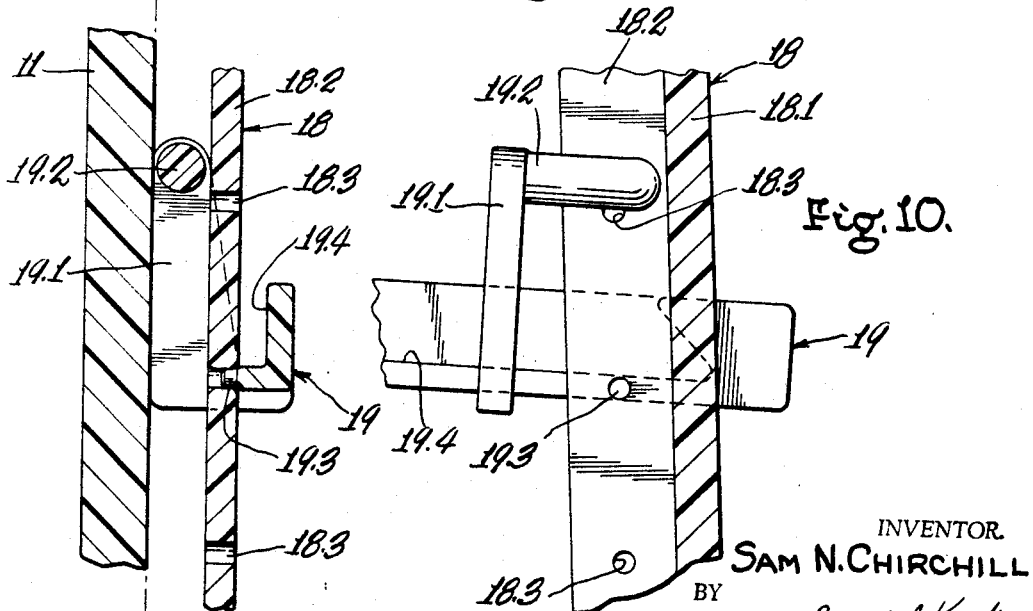
Figure 13:
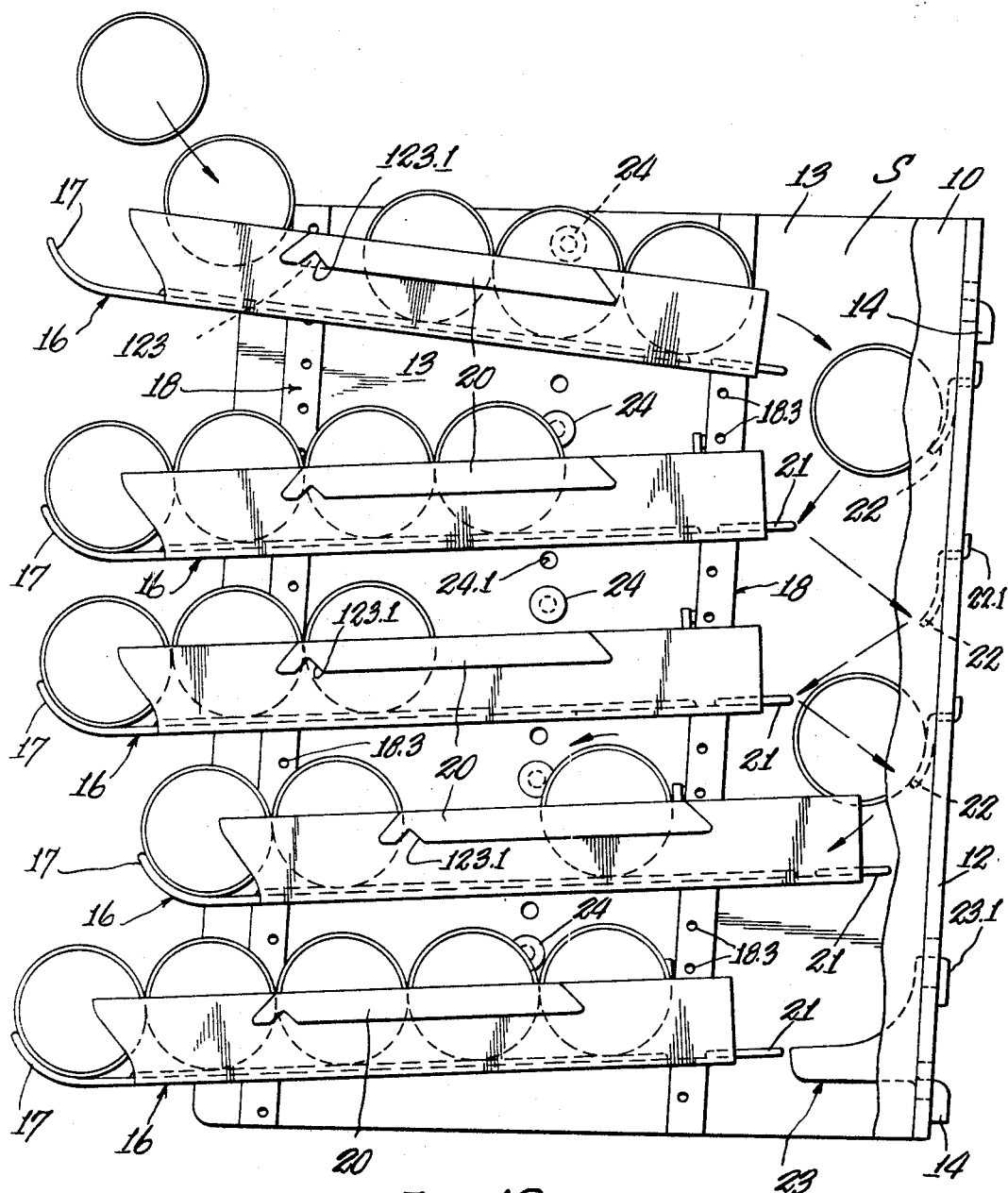

FIGURE 3 is a top plan view generally corresponding to the line 3—3 of FIGURE 1, FIGURE 4 is a fragmentary sectional view generally corresponding to the line 4—4 of FIGURE 3, FIGURE 5 is a fragmentary sectional view generally corresponding to the line 5—5 of FIGURE 1, FIGURE 6 is an enlarged, fragmentary sectional view generally corresponding to the line 6—6 of FIGURE 3, FIGURE 7 is a reduced size, side elevational view with certain parts on the near side removed to show the underlying structure, FIGURE 8 is a fragmentary, enlarged sectional view generally corresponding to the line 8—8 of FIGURE 7, FIGURE 9 is a further enlarged, fragmentary sectional view generally corresponding to the line 9—9 of FIGURE 8, FIGURE 10 is a fragmentary sectional view generally corresponding to the line 10—10 of FIGURE 9, FIGURES 11 and 12 are reduced size, perspective views of respective details, FIGURE 13 is a side elevational view, with parts on the near side removed to show the underlying structure, and illustrating the position of parts during a rack loading operation, FIGURE 14 is a reduced size side elevational view illustrating a pair of racks of the type seen in FIGURES 1, 2 and 3 combined to form a multiple unit, FIGURE 15 is an enlarged perspective view of a detail seen in FIGURE 14, FIGURE 16 is a top plan view of a detail which is modified from that previously shown, FIGURES 17 and 18 are fragmentary, enlarged sectional views generally corresponding to the lines 17—17 and 18—18 respectively, of FIGURE 16, FIGURE 19 is a fragmentary view similar to FIGURE 13, but of another embodiment, FIGURE 20 is a fragmentary top plan view of a modified structure, FIGURE 21 is a fragmentary side elevational view generally corresponding to the line 21—21 of FIGURE 20, FIGURE 22 is a front elevational view generally corresponding to the line 22—22 of FIGURE 20, and FIGURE 23 is a sectional view generally corresponding to the line 23—23 of FIGURE 20.

With reference first to FIGURES 1, 2 and 3, the rack provided by the present invention comprises support means formed of horizontally spaced, upright side walls 10 and 11 and an upright rear wall 12. In the embodiment illustrated, there is also provided an intermediate wall 13 between the walls 10 and 11.

In the present embodiment, it is preferable that the walls 10, 11 and 13 are not only removably secured to rear wall 12 but that they are also relatively shiftable to vary the horizontal spacing therebetween. For this purpose, each of the walls 10, 11 and 13 may have rearwardly projecting, downwardly turned hooks 14 at their upper and lower ends which extend through respective apertures 15 in the rear wall 12 (see FIGURE 2) and engage behind such wall. In order to provide for adjustment of the horizontal spacing between the walls 10, 11 and 13, apertures 15 are horizontally elongated as shown.

Carried between the walls 10, 11 and 13, in a manner later to be disclosed, are a plurality of shelves 16. As presently disclosed, five vertically spaced shelves 16 are disposed between the walls 10 and 13 while a similar number of shelves are disposed between the walls 11 and 13. For a purpose to appear, all of the shelves 16 normally slope downwardly, from rear to front, whereby cans or other cylindrical articles will roll from the rear to the front thereof. To prevent the articles from rolling off the front of the shelves, each is provided with an upwardly curved tongue 17 at its front end which will arrest rolling movement of an article on the shelf.

As best seen in FIGURES 1, 3 and 6, each shelf 16 comprises a floor 16.1 and spaced, opposed side walls 16.2. In order to facilitate rolling movement of the articles along respective shelves, each floor may be provided with longitudinally extending ribs 16.3 for engagement with the article while each shelf side wall 16.2 may have similar longitudinally extending ribs 16.4 for engagement with respective article ends.

As previously mentioned, shelves 16 are vertically shiftable to vary the vertical spacing therebetween and, for reasons to appear, all but the lowermost shelf are shiftable longitudinally (i.e.; horizontally with but a slight vertical component as a result of their inclination) and for this purpose, the shelves 16 are indirectly secured to respective walls 10, 13 and 11, by means of the following structure:

As best seen in FIGURES 3, 7 and 8, and first considering only side wall 11, the inner side of the latter is provided with vertically extending, horizontally spaced, structurally integral members 18. Each member 18 is preferably of angular form with a leg 18.1 projecting from the wall and a leg 18.2 extending parallel to the wall. For reasons to appear, legs 18.2 of respective members project toward each other, such legs, and the adjoining side wall 11, providing a vertically extending channel. Member legs 18.2, as best seen in FIGURE 7, are provided with a series of spaced apertures 18.3 for a reason to appear. It is to be noted at this time, as shown in FIGURE 3, that the inner portion of side wall 10 and both sides of intermediate wall 13, are provided with similar pairs of members 18, all of such member pairs being in horizontal alignment.

Adapted to be carried by the wall members 18 are slides 19 upon which the shelves 16 are supported. As best seen in FIGURE 6, a pair of slides 19 is required for each shelf, the slides being disposed on opposite sides thereof. Each slide is herein disclosed as being formed of an elongated bar having upstanding legs 19.1 adjacent respective ends for fitting between the angle members 18 and on the side thereof adjacent the wall on which the slide is supported. Each leg 19.1 is provided with a rounded pin 19.2 for close reception in respective channels provided by the member legs 18.2 and the adjoining wall. Projections 19.3 (see especially FIGURE 9) are formed on each slide and are closely receivable in respective apertures 18.3 of the member legs 18.2 so as to positively locate the slide and lock it in position on its pair of angle members 18.

Each slide 19, on its side adjacent its supporting wall, is slotted at 19.4 (FIGURES 6, 7, 8, 9 and 10) to receive an elongated, depending tongue 20 (FIGURE 6) formed on respective sides of each shelf. Since the shelf tongues 20 are of less than the slide slots 19.4 (compare FIGURES 7 and 13), each shelf may be slid along its slides 19 in a direction longitudinally thereof for reasons to appear and as will later be pointed out with more particularity. As seen in FIGURES 7 and 10, the ends of each slide slot 19.4 are formed at an angle with the ends of the shelf tongues 20 (FIGURES 1 and 13) formed at a complementary angle. Thus, when a shelf tongue is positioned at either end of its slide slot, the adjoining end of the shelf is locked against vertical movement by virtue of engagement of respective shelf tongue ends with respective slide slot ends.

When the vertical position of a shelf is to be changed, such shelf will be first elevated to disengage it from its slides 19 and then removed in a forward direction. The appropriate slides 19 may now be rotated upwardly, about their pins 19.2 to disengage their projections 19.3 from the member apertures 18.3. The slides may now be repositioned and then locked against displacement by re-engaging their projections 19.3 in appropriate apertures 18.3. Following repositioning of the slides, the shelf may be re-engaged therewith. Note that the spacing of the apertures 18.3 and their location is such that the slide projections 19.3 will only enter therein when the slide is at the proper inclination shown.

As previously mentioned, shelves 16 are shiftable longitudinally of their slides 19 and in the present embodiment, while only the shelves intermediate the lowermost and uppermost shelves need be so shiftable, the same structure is used for all in the interest of interchangeability.

With reference to FIGURE 1, the normal position of the shelves is shown, all shelves being in the forwardmost positions to leave a space S at the rear between such shelves and the support means rear wall 12. Each shelf, see also FIGURES 3, 4 and 5, removably carries a rearward extension 21 for its floor 16.1 for adjusting the space between the rear of its shelf and the rear wall 12. As herein disclosed, each shelf floor extension 21 may carry projections 21.1 (FIGURE 4) selectively and frictionally receivable in spaced apertures 21.2 formed in each shelf floor.

Removably carried on the inner side of the rear wall 12 adjacent all but the uppermost and lowermost shelves 16 are deflectors 22 (FIGURE 1) whose function will appear. Each deflector may carry prongs 22.1 (FIGURE 12) receivable in apertures 22.2 in the rear wall 12. As seen in FIGURE 2, a series of apertures 22.2 is provided so that the deflectors may not only be shifted vertically in accordance with vertical shelf adjustment but also horizontally to accommodate a greater or lesser number of vertical rows of shelves than the two rows herein disclosed.

In addition to the deflectors 22, lower deflectors 23 are carried by the rear wall 12 adjacent the lower shelves 16. Deflectors 23 each have a rearwardly and downwardly extending tab 23.1 (FIGURES 1, 2 and 5), each of such tabs extending through a horizontally elongated aperture 23.2 in the rear wall 12 and engaging therebehind to hold the deflector in position. Elongation of apertures 23.2 of course, allows the deflectors 23 to be horizontally positioned as required in the event a greater or lesser number of vertical rows of shelves are provided.

It is to be especially noted (FIGURE 1) that while deflectors 22 project but a relatively short distance from the wall 12, deflectors 23 project far enough therefrom to nearly abut the shelf extension 21 on the lower shelf 16. Thus, the lower deflectors substantially block the lower ends of the vertical spaces S as will appear.

Turning now to the manner in which the shelves 16 are adapted to be loaded with cylindrical articles such as jars or cans, this is accomplished, broadly stated, by permitting the articles to gravitate down the previously mentioned space S between the rear support wall 12 and the shelves 16. More specifically and with reference to FIGURE 13 and assuming first that the next to lowermost shelf 16 is to be loaded, the latter will be pushed rearwardly along its slides 19 to the position seen in this figure. The uppermost shelf 16 will next be positioned as shown to slope from front to rear by elevating its forward portion and supporting it on triangular protuberances 123 formed on the upper ends of respective forwardmost vertically extending angular members 18. such protuberances 123 are adapted to received within respective notches 123.1 formed in the tongues 20 of the uppermost shelf 16. For interchangeability, each of the shelf tongues 20 will preferably be provided with respective notches 123.1.

With the uppermost shelf 16 tilted as seen in FIGURE 13, articles may be loaded into the forward end of such shelf and such articles will gravitate rearwardly to drop off the rear thereof into the space S. In falling off the rear of the uppermost shelf 16, the article will first strike the uppermost deflector 22 and be deflected to the extension 21 of the next lower shelf 16. The falling article will then be deflected to the next lower deflector 22 and be deflected to the extension 21 of the next lower shelf 16.

The falling article will further be deflected to the next lower deflector 22 and thence into the next lower shelf 16, which as presently disclosed, is in its rearwardmost position. Such article will roll forwardly along the next to lowermost shelf 16 until it is stopped by the shelf tongue 17. Successive articles may be deposited in the upper shelf 16, each gravitating as above described, until the next to lowermost shelf is filled. Such shelf may then be slid forwardly to its normal position shown in FIGURE 1.

During gravitation of the articles down the space S as previously described, the zig-zag path followed thereby in striking the deflectors 22 and the shelf extensions 21 will so reduce the downward velocity of the articles that they will not break in the event one collides with another, even if the articles are glass jars, and will not enter a shelf with such speed that the shelf tongue 17 will be unable to arrest their movement.

Each of the shelves, with the exception of the uppermost and lowermost shelves, will be filled in a manner similar to that hereinabove described, it being only necessary to push the shelf to be filled to its rearmost position. As respects the lowermost shelf, the latter will be filled merely by having all the overlying shelves in their forwardmost positions thus permitting the articles to gravitate all the way down the space S to the deflector 23 and then into the lowermost shelf. The uppermost shelf 16, of course, may be filled directly when it is in the position seen in FIGURE 1.

In order to prevent excess tilting of a shelf, as when the first article to be loaded thereon strikes the rear thereof, or in the event a customer presses down on the forward end of a shelf when removing an article therefrom, the inner sides of side walls 10 and 11 and both sides of intermediate wall 13 carry abutments 24 (see especially FIGURES 3, 6 and 13) which overlie respective shelf sides. Such abutments, as herein shown, may comprise cylindrical bodies each having a projection frictionally fitting in respective apertures 24.1 formed in the walls aforesaid. In order to provide for the previously mentioned vertical adjustment of the shelves 16, a series of selectively usable, spaced apertures 24.1 are provided.

With the parts positioned as seen in FIGURE 1 and assuming all of the shelves to be filled with articles, a customer may readily select and withdraw an article from the forward end of any of the selves. It will be mentioned at this time that each shelf will preferably contain but one type of article; however, a vertical row of shelves may all contain the same type of article or as many different articles as there are shelves. As an article is removed from the forward end of a shelf, the remaining articles on such shelf will roll forwardly until stopped by the tongue 17 thereby presenting another article for easy removal by a customer.

While mention has been made of the provisions for adjusting the vertical spacing between the shelves; this being necessitated, perhaps, by the requirement that materially larger diameter articles be handled than the ones herein shown, the invention also contemplates making provision for materially taller articles than thus far disclosed. Obviously, in order to handle taller (or more elongated) articles, the width of the shelves 16 must be increased and as seen in FIGURES 16, 17 and 18, wherein corresponding parts are identified by the same reference characters as before but with the suffix *a* added, it is contemplated that this will be accomplished by dividing each shelf 16 longitudinally along its floor 16.1*a* The rear of such shelf will be held in the desired assembled relation by the extension 21*a* the shelf floor being provided with transversely spaced apertures 21.2*a* as well as longitudinally spaced ones to selectively and frictionally receive the shelf extension projections.

At the front of the shelf, the tongue 17*a* is no longer integral with the shelf but is formed as part of a transverse member 25 which retains the front of the shelf in the desired assembled relation. A forward portion 25.1 overlies respective floor portions 16.1*a* of the shelf while a rear portion 25.2 thereof underlies such shelf floor portions. A connecting member portion 25.3 passes through a clearance slot 25.4 formed in respective portions of the shelf floor 16.1*a* and the member portion 25.1 carries projections 25.6 frictionally and selectively receivable in respective spaced apertures 25.7 formed in the shelf floor portions. As best seen in FIGURE 16, by properly positioning the member 25 and the extension 21*a*, the width of the shelf may be extended from the full line position shown to the phantom line position.

It is desirable, especially when the articles being stored and dispensed are clear glass jars of certain baby food or the like, to protect such jars against prolonged exposure to light. This may readily be effectuated, as seen in FIGURE 19 wherein similar parts are identified by the same reference characters as before but with the suffix *b* appended, by securing to the bottom of each shelf which overlies a shelf containing jars to be so protected, an opaque strip 26 of cloth or other flexible material. Preferably, each strip 26 will extend full length and full width of the shelf and will be fastened at respective ends thereof with sufficient slack to lie upon the underlying articles. Strip 26 may also, if made of an absorbent material such as flannel or the like, function to dust the articles as they roll along the underling shelf.

Under certain circumstances, it may be desirable to present the articles in upright relation for removal by the customer. In such event, the structure shown in FIGURES 20 through 23, wherein similar parts are identified by the same reference characters as before but with the suffix *c* added, may be employed. In this embodiment, the previously disclosed tongue at the forward end of the shelf is eliminated and a basket-like structure 27 is secured to such shelf end. As herein disclosed, such structure presently comprises a U-shaped wire 28 having legs 28.1 and 28.2 forming forward extensions of respective shelf sides 16.2*c* and a connecting base leg 28.3. Preferably, the free ends of legs 28.1, 28.2 may be turned outwardly at 28.4 for seating within apertures formed in respective shelf sides 16.2*c*. Thus, the structure may readily be removed and assembled with the shelf by springing the legs 28.1, 28.2 together to permit entry or removal of the ends 28.4 from their shelf apertures.

Basket structure 27 also comprises a depending strip 29 having an upright leg 29.1 whose free end is attached to an intermediate portion of the wire leg 28.2, an upright leg 29.2 spaced from leg 29.1, and a connecting leg 29.3. A support wire 30 extends transversely of the free end of the strip leg 29.2 and is secured to the flood 16.1*c* of the shelf, as in a manner similar to the previously described securement of the wire legs 28.1, 28.2 to the shelf side walls, to form a continuation of the shelf floor for the purpose to appear. Note that the wire 30 is closest to, but is spaced from the left, side wall 16.2*c*.

In operation and as a cylindrical article rolls down the shelf and off the lower end thereof, the left end of the article, in the position of parts viewed in FIGURES 20 and 22, will remain supported by the wire 30. The right end of the article, however, being unsupported at this time, will fall (as shown in phantom lines in FIGURE 22) until the article rests in upright relation on the strip connecting leg 29.3 to await its removal by a customer. When the upright can is removed, the next successive can will, of course, gravitate down to take its place.

With reference now to FIGURES 14 and 15, in the event it is desired to vertically stack a pair of supporting assemblies together with their shelves, the grooved spacers 31 (FIGURE 15) may be installed between the side walls of respective supporting assemblies. As herein disclosed, a pair of spacers may be installed between the upper and lower near side walls and a pair between the upper and lower far side walls. Because of the spacers' deep grooves 31.1 in which are closely and respectively receivable the side wall of an upper assembly and the side wall of a lower assembly, such assemblies will be rigidly held in assembled relation.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

Summary

The present invention provides a cabinet for storing, displaying and dispensing jars or cans of food, and comprises a plurality of superposed shelves. All shelves, except the lowermost, are mounted so as to be slidable in a direction toward and away from the rear of the cabinet, and each shelf has a tail or extension at its rear end. In normal filling operation, all shelves are in a forward position, and the top shelf is tilted to incline downwardly toward the rear of the cabinet and when so tilted articles thereon will roll to the back of the top shelf and drop off the rear end thereof and into a vertical space. In so falling, an article will first strike the uppermost of a series of verticaly spaced deflectors and be shuttled back and forth by cooperating deflectors and shelf tails to travel a zig-zag downward path to safely break the speed of fall.

In the event the lowest shelf is empty and all upwardly succeeding shelves have been pulled out, the falling articles will drop to the lowest shelf, where a deflector will direct the article to position on this shelf. When the lowest shelf is filled, the next lowest may be filled by pushing it inward so that its rear portion is in position to have articles deflected on to it, and the procedure is followed until all shelves are filled.

I claim:

1. A top-loading rack for storing cylindrical articles and for dispensing the same from the front thereof, comprising support means, and a plurality of elongated shelves each adapted to receive articles in side-by-side relation, said shelves being carried by said support means in verticaly spaced relation and each being inclined from the horizontal to dispose its front at a lower level than its rear whereby articles disposed on said shelves will roll from the rear to the front thereof, a shelf above the lowermost shelf normally being spaced forwardly of a part of said support means to provide a vertical passage at the rear of such shelf through which articles may gravitate to an underlying shelf and said first-mentioned shelf being selectively shiftable rearward to block said vertical passage thus providing for diversion of gravitating articles to said first-mentioned shelf when the latter is to be loaded with articles.

2. The construction of claim 1 wherein slide means is carried by said support means and wherein said first-mentioned shelf is mounted on said slide means for rearward movement aforesaid.

3. The construction of claim 2 wherein said slide means comprises a pair of track-like members on opposite sides of said first-mentioned shelf.

4. A top-loading rack for storing cylindrical articles and for dispensing the same from the front thereof comprising support means, and a plurality of elongated shelves each adapted to receive articles in side-by-side relation, said shelves being carried by said support means in vertically spaced relation and each being inclined from the horizontal to dispose its front at a lower level than its rear whereby articles disposed on said shelves will roll from the rear to the front thereof, all shelves above the lowermost shelf normally being spaced forwardly of a part of said support means to provide a vertical passage through which articles may gravitate to the underlying shelves and each of said shelves intermediate the uppermost and lowermost shelves being selectively shiftable rearwardly to block said vertical passage thus providing for diversion of gravitating articles to the shelf so shifted when the latter is to be loaded with articles.

5. The construction of claim 4 wherein slide means is carried by said support means and wherein each of said shelves intermediate the uppermost and lowermost shelves is mounted on said slide means for rearward movement aforesaid.

6. A top-loading rack for storing cylindrical articles and for dispensing the same from the front thereof, comprising support means providing a vertical passage through which articles may gravitate, a plurality of elongated shelves each adapted to contain articles in side-by-side relation, said shelves being carried by said support means in vertically spaced relation and each normally being inclined from the horizontal with its rear disposed adjacent said passage and at a higher level than its front whereby articles disposed thereon will roll from the rear to the front thereof, the uppermost of said shelves being selectively tiltable to a position inclined from the horizontal with its front at a higher level than its rear whereby articles disposed thereon will roll toward said vertical passage, and means for selectively effecting diversion of articles gravitating through said vertical passage to selected shelves underlying said uppermost shelf, each shelf intermediate said uppermost and the lowermost shelves being movable rearwardly to block said vertical passage thus providing for article diversion aforesaid to the shelf so shifted when the latter is to be loaded with articles.

7. A rack for supporting articles, comprising support means providing a vertically extending channel, a plurality of article-supporting shelves carried by said support means in vertically spaced relation, and a member for supporting each shelf and each having a first portion for engagement with a respective shelf and a second portion spaced from said first and slidably fitting within said channel for vertical guidance thereby, said members being adjustable along said channel to vary the vertical spacing between the supported shelves.

8. The construction of claim 7 wherein said support means provides horizontally spaced, oppositely facing channels and wherein each of said members has second portions spaced from its first and slidably fitting within respective channels for the purpose aforesaid.

9. The construction of claim 8 wherein the channels provided by said support means are in facing relation.

10. The construction of claim 9 wherein each member first portion has a projection closely receivable in respective apertures in said support means to retain said members in the desired adjusted position.

11. A rack for supporting articles, comprising support means providing horizontally spaced, vertically extending channels, a plurality of article-supporting shelves in vertically spaced relation carried by said support means between said channels, and a member on opposite sides of each shelf for supporting the latter and each having a first portion for engagement with a respective shelf side and a second portion spaced from said first and slidably fitting within respective adjoining channels for vertical guidance thereby, said members being adjustable along respective channels to vary the vertical spacing between the supported shelves.

12. A rack for supporting articles, comprising a plurality of article-supporting shelves in vertically spaced relation, support means for said shelves and providing a pair of vertically extending, horizontally spaced, facing channels on opposite sides of said shelves, and a pair of members for supporting each shelf with the members of each pair being disposed on opposite sides of respective shelves, each member having a first portion for engagement with respective shelves and a second portion spaced from said first and slidably fitting within respective adjoining channels for vertical guidance thereby, said members being adjustable along said channels to vary the vertical spacing between the supported shelves.

13. The construction of claim 12 wherein each member second portion aforesaid is generally cylindrical to provide for rotation thereof within respective channels and wherein each member first portion aforesaid and said support means have respective, interengageable portions for retaining said members in desired adjusted positions.

14. The construction of claim 12 wherein each member second portion is generally cylindrical to provide for rotation thereof within respective channels and wherein each member first portion has a projection closely receivable in respective apertures in said support means to retain said members in the desired adjusted position.

15. A rack for storing articles, comprising support means, an article-supporting shelf carried by said support means and having a bottom wall and upstanding opposed side walls, said shelf being divided to provide a pair of shelf sections in side-by-side relation, said sections having portions mutually cooperable to provide said bottom wall and each shelf section provides a side wall, those portions of said shelf sections which provide said bottom wall being formed with aligned slots, and bridging means extending between and connecting said shelf sections, said bridging means extending through said slots and having portions respectively overlying said bottom wall.

16. The construction of claim 15 wherein said shelf sections and said bridging means are connected together by pins carried by one of the foregoing and frictionally receivable in apertures formed in the other.

17. A rack for storing articles and for dispensing the same from the front thereof, comprising an article-supporting shelf inclined from the horizontal to dispose its front at a lower level than at its rear whereby articles disposed on said shelf will roll from the rear to the front thereof, said shelf having a bottom wall and upstanding, opposed side walls and said shelf being divided from front to rear to provide a pair of shelf sections in side-by-side relation which are mutually cooperable to provide said bottom wall, each shelf section providing a respective side wall and the portions of said shelf sections providing said bottom wall having aligned slots adjacent the front of said shelf, and bridging means having portions respectively overlying and underlying said bottom wall and various portions of said bridging means and said shelf sections being selectively connectable together to provide for varying the effective size of said shelf in accordance with the size of the articles being stored, said bridging means having an upwardly directed protuberance for engagement with the foremost article on said shelf to limit forward movement thereof.

18. The construction of claim 17 wherein the bridging means portion which overlies said shelf bottom wall is closer to the front of said shelf than is the bridging means portion which underlies such shelf bottom wall and wherein said bottom wall overlying bridging means portion carries said protuberance.

19. A rack for storing articles comprising a plurality of article-supporting shelves in vertically spaced relation and each shelf being divided to provide a pair of shelf sections in side-by-side relation which are transversely adjustable to vary the effective width of such shelf in accordance with the size of the articles being stored, and support means for said shelves providing a pair of upstanding, horizontally spaced portions for receiving and supporting said shelves therebetween, said support means portions being relatively movable toward and away from each other to vary the space therebetween in accordance with the size of said shelves, and each of said portions having a plurality of slide guides which are spaced vertically in correspondence with the vertical spacing of said shelves, corresponding slide guides on said portions engaging and slidably supporting respective sides of a shelf.

20. A rack for storing cylindrical articles, comprising an article-supporting shelf inclined from the horizontal to dispose one end at a higher level than its opposite end whereby articles disposed on said shelf will roll from said one end to said other end, and a flexible wiper member overlying said shelf for engagement with articles rolling therealong to remove any dust present on said articles.

21. The construction of claim 20 wherein there are a plurality of similarly arranged, article-supporting shelves in aligned, vertically spaced relation and wherein a wiper member is carried by each shelf for engagement with articles rolling along the adjoining, underlying shelf.

22. A rack for storing cylindrical articles and for dispensing the same from the front thereof, comprising a plurality of article-supporting shelves in aligned, vertically spaced relation and each being disposed with its front at a lower level than its rear whereby articles disposed thereon will roll from the rear to the front thereof, and a flexible wiper member depending from all except the lowermost shelf for engagement with articles rolling along an adjoining, underlying shelf to remove any dust present on said articles, each wiper member comprising an elongated strip secured by its ends and with its intermediate portion hanging loosely for engagement with articles on the shelf immediately therebeneath.

23. The construction of claim 22 wherein said wiper members are of a width substantially equal to the length of said cylindrical articles and wherein said wiper members are opaque to protect said articles from light.

24. A rack for storing articles and dispensing the same from the front thereof, comprising support means providing vertically spaced pairs of horizontally spaced slide-guides, a shelf for each pair of slide guides, each shelf having its opposite sides resting on respective ones of the associated pair of slide guides but being removable therefrom by merely lifting the shelf upwardly, each shelf being slidable horizontally along its associated pair of slide guides but because of merely resting thereon being susceptible of swinging movement about said slide guides to tilt opposite ends thereof, and abutment means for each shelf and each disposed in the path of swinging movement of an associated shelf to restrict swinging movement of the same, each pair of slide guides being vertically adjustable to provide for adjustment of the vertical spacing between shelves and said abutment means being vertically shiftable in accordance with the vertical positions of their associated shelves.

25. The construction of claim 24 wherein said abutment means comprises a pair of stud-like members for each shelf, wherein respective members of each pair are disposed on opposite sides of an associated shelf, wherein said members closely fit within respective apertures formed in said support means, and wherein a plurality of apertures are formed in said support means for each of said members to provide for vertically shifting the same in accordance with the vertical positions of their associated shelves.

26. A top-loading rack for storing cylindrical articles and for dispensing the same from the front thereof, comprising support means providing a vertical passage through which articles may gravitate, a plurality of elongated shelves each adapted to contain articles in side-by-side relation, said shelves being carried by said support means in vertically spaced relation and each normally being inclined from the horizontal with its rear disposed adjacent said passage and at higher level than its front whereby articles disposed thereon will roll from the rear to the front thereof, the uppermost of said shelves being selectively tiltable to a position inclined from the horizontal with its front at a higher level than its rear whereby articles disposed thereon will roll toward said vertical passage, means for selectively effecting diversion of articles gravitating through said vertical passage to selected shelves underlying said uppermost shelf, and means for selectively retaining said uppermost shelf in said position wherein its front is at a higher level than its rear for the purpose aforesaid.

27. A rack for storing and dispensing cylindrical articles and which is loaded from the top and unloaded from the front, comprising means providing a vertically disposed passage at the rear of the rack through which articles may gravitate through a tortuous path to limit the rate of article descent, said means including a plurality of vertically spaced shelves each with its rear disposed adjacent to a vertical portion of said passage for receiving articles gravitating therethrough and each of said shelves being inclined from the horizontal with its rear at a higher level than its front whereby articles disposed thereon will roll from the rear to the front thereof, said means also including a plurality of vertically spaced deflectors aligned with the rear of respective shelves and combining therewith to make said passage tortuous, the rear of each shelf and its respective deflector being relatively movable toward and away from each other to vary the size of the passage thereat, movement away increasing the size of said passage at this point so that articles are encouraged to fall to a lower point therein, and movement toward restricting the size of said passage at this point to encourage articles to deposit on the respective shelf.

28. A rack for storing and dispensing cylindrical articles and which is loaded from the top and unloaded from the front, comprising means providing a vertically disposed passage through which said articles may gravitate through a tortuous path which limits the rate of article descent, a plurality of shelves, each with its rear disposed adjacent said passage for successively receiving articles gravitating therethrough and said shelf being inclined from the horizontal with its rear at a higher level than its front whereby articles disposed thereon will roll from the rear to the front thereof, and abutments disposed in said passage for engagement with the gravitating articles to compel movement thereof in said tortuous path for the purpose aforesaid, said abutments being disposed in said passage in horizontally disposed, vertically spaced relation, said shelves being relatively shiftable to vary the vertical spacing therebetween, said abutments being in part provided by the rear portions of certain of said shelves, the abutments in opposed relation to said shelf rear portions also being relatively shiftable to vary their vertical spacing in accordance with the vertical spacing between said shelves.

References Cited

UNITED STATES PATENTS

| | | | |
|---|---|---|---|
| 539,662 | 5/1895 | Beckwith. | |
| 741,434 | 10/1903 | Anderson. | |
| 1,256,241 | 2/1918 | McGinnis | 312—348 X |
| 2,254,832 | 9/1941 | Weight | 312—348 X |
| 1,457,177 | 5/1923 | Lee | 193—27 X |
| 1,745,784 | 2/1930 | Davis | 211—71 X |
| 2,382,191 | 8/1945 | Weichselbaum | 312—45 |
| 2,769,551 | 11/1956 | Just | 211—49 |
| 2,890,780 | 6/1959 | Schuricht | 193—27 |
| 3,034,626 | 5/1962 | Kay | 193—32 |
| 3,286,846 | 11/1966 | Brandes | 211—49 |

ROY D. FRAZIER, *Primary Examiner.*

A. FRANKEL, *Assistant Examiner.*